Dec. 12, 1967 H. A. HELM 3,358,082

TIME DIVISION MULTIPLEX DIGITAL TRANSMISSION ARRANGEMENT

Filed July 28, 1964 2 Sheets-Sheet 1

INVENTOR
H. A. HELM
BY Lucian C. Canepa
ATTORNEY

United States Patent Office 3,358,082

Patented Dec. 12, 1967

3,358,082

TIME DIVISION MULTIPLEX DIGITAL TRANSMISSION ARRANGEMENT

Harry A. Helm, Morristown, N.J., assignor to Bell Telephone Laboratories, Incorporated, New York, N.Y., a corporation of New York Filed July 28, 1964, Ser. No. 385,564
13 Claims. (Cl. 178—50)

ABSTRACT OF THE DISCLOSURE

A digital data transmission system is proposed. Activation of selected ones of a set of sending stations causes the correponding ones of a set of encoders to each generate a unique $n$-digit binary word. The words so generated are combined by an adder to form a composite $n$-digit representation that is transmitted to a receiving terminal having a set of stations respectively corresponding to the sending stations. Selected digits of the received composite representation are applied to each of a set of decoders respectively associated with the receiving stations, whereby each receiving station corresponding to an activated sending station is supplied with a "1" signal.

Figure 1A:
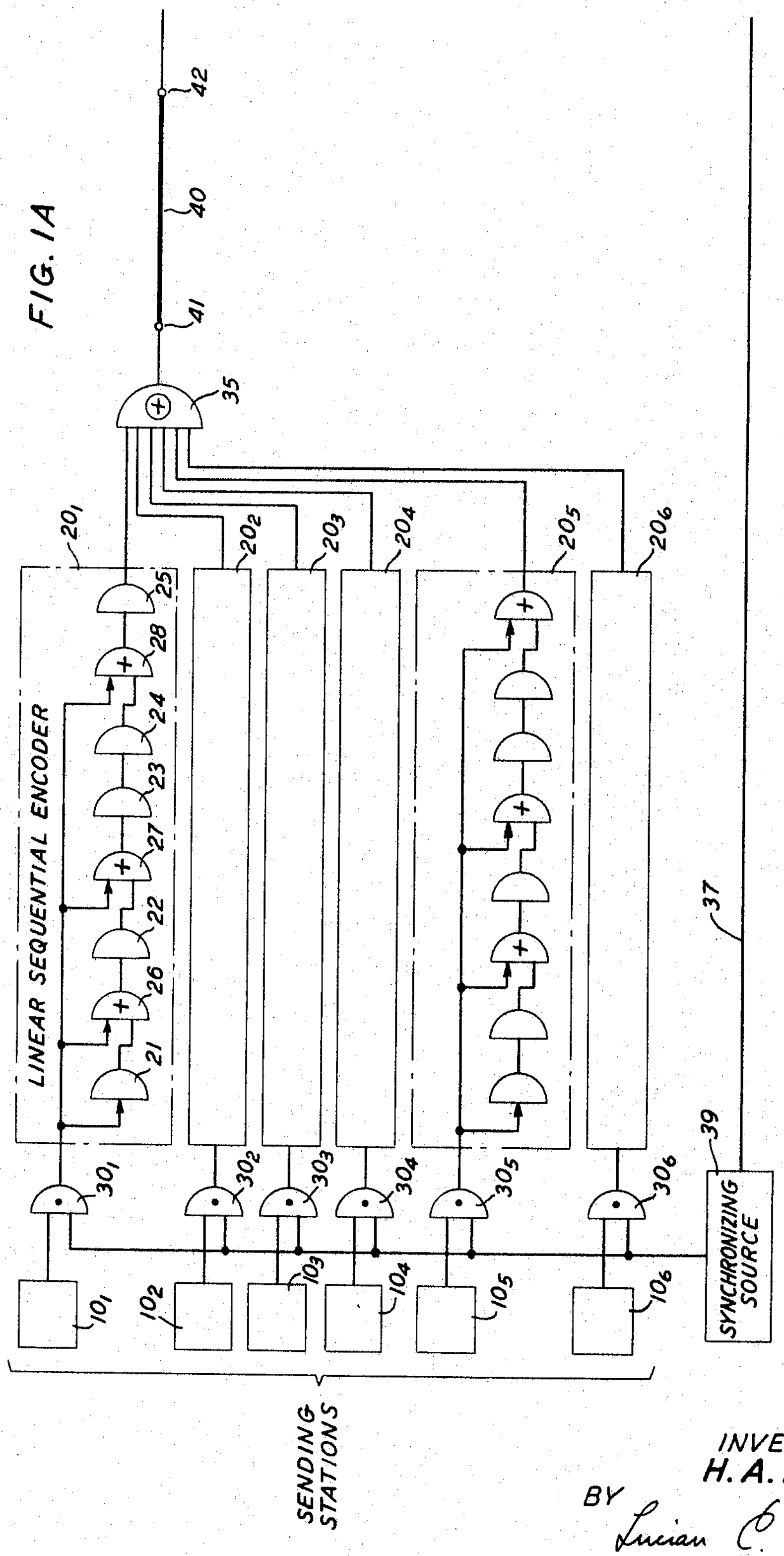

This invention relates to data communication systems and, more specifically, to a time division transmission arrangement for multiplexing a plurality of digital words onto a common communication link.

In prior art time division digital multiplexing systems, output information signals supplied by a plurality of sending stations are periodically sampled in particular time slots over recurring sampling intervals. The signals derived from the respective stations are then sequentially multiplexed onto a single common communication channel.

At the output terminal of the channel, a cyclic timing switch sequentially gates the incoming digital signals to a plurality of receiving stations, each of which receives one bit of information for each sampling cycle. During proper circuit functioning, associated sending and receiving stations are coincidentally connected to the common link during a particular, cyclicly recurring time slot.

However, should loss of timing synchronization occur between the sending and receiving gating circuitry, prior art systems divert legible messages to incorrect receiving addresses.

It is therefore an object of the present invention to provide an improved time division digital multiplexing transmission system.

More specifically, an object of the present invention is the provision of a time division multiplexing arrangement which generates unintelligible messages when synchronization is lost between the sending and receiving stations.

Another object of the present invention is the provision of a time division multiplexing arrangement which may advantageously be relatively simply and inexpensively constructed, and which is highly relative.

These and other objects of the present invention are realized in a specific, illustrative time division arrangement which multiplexes a plurality of digital words onto a common communication link. The arrangement includes $n$ digital sending stations each connected via an associated linear sequential encoder and a common modulo 2 adder to the input end of a transmission channel. Similarly, $n$ receiving stations, each communicating with a corresponding sending station, are joined by linear sequential decoders to the output end of the common channel.

Respsonsive to a binary "1" information signal supplied thereto by the associated sending station, each encoder generates a unique, characteristic $n$-bit binary word. The signals so generated are processed by the adder and sequentially impressed on the common link.

At the output end of the transmission channel, each decoder detects the relative presence or absence of an associated encoded word in the composite signal on the link. The decoded input intelligence is then supplied to the corresponding receiving station.

It is thus a feature of the present invention that a time division digital multiplexing arrangement comprise $n$ sending stations each connected to a common transmission link by an associated linear sequential encoder and a common modulo 2 adder, wherein each encoder responds to a binary "1" signal supplied thereto by the associated sending station by generating a unique, characteristic $n$-bit digital word.

It is another feature of the present invention that a time division digital multiplexing arrangement include a transmission channel, a first modulo 2 adder connected to the input end of the channel, circuitry for coincidentally supplying up to $n$ characteristic digital words to the adder, and $n$ linear sequential decoders respectively connecting the output end of the transmission channel with $n$ receiving stations.

A complete understanding of the present invention, and of the above and other features, advantages and variations thereof may be gained from a consideration of the following detailed description of an illustrative embodiment thereof presented hereinbelow in conjunction with an accompanying drawing, in which FIGS. 1A and 1B respectively comprise the left and right portions of a schematic diagram of an illustrative time division digital multiplexing arrangement made in accordance with the principles of the present invention.

Figure 1B:
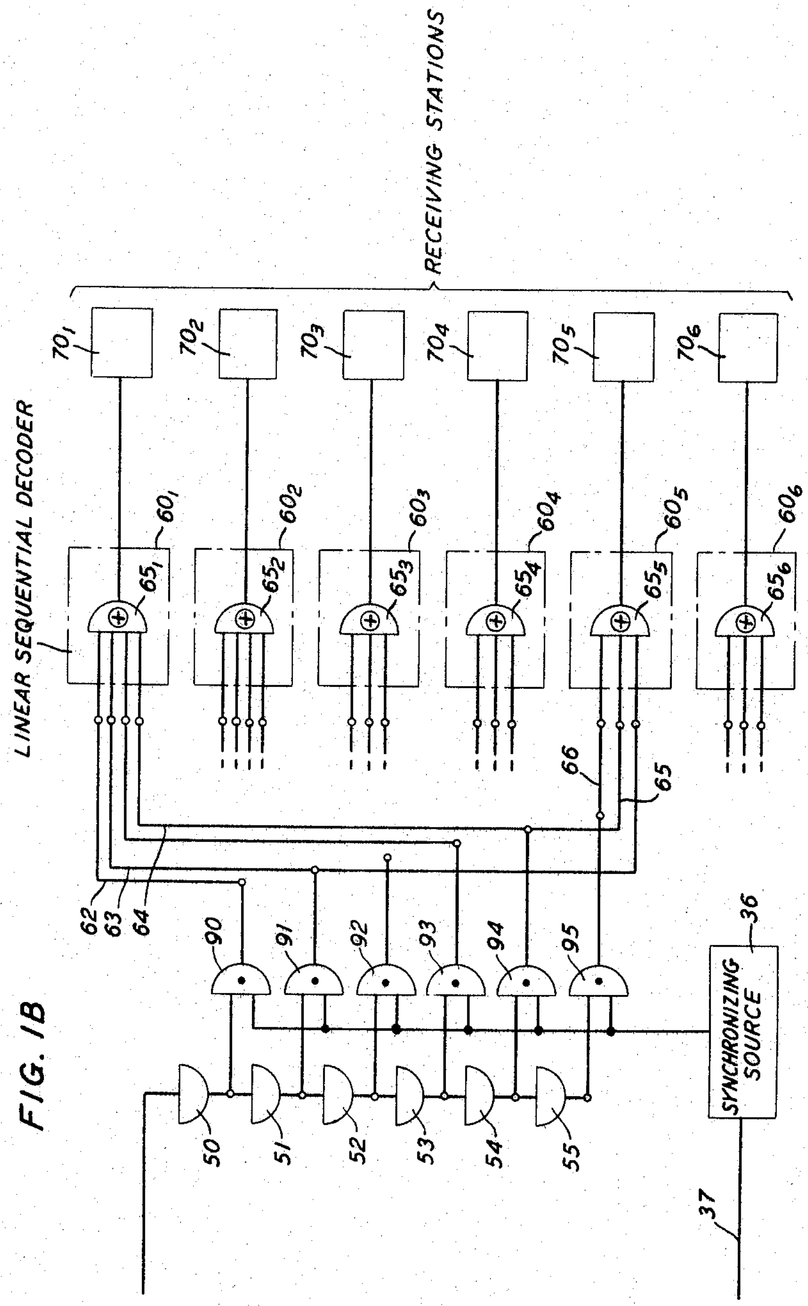

Referring now to FIGS. 1A and 1B, hereinafter referred to as composite FIG. 1, there is shown a specific, illustrative time division arrangement for multiplexing a plurality of digital words onto a common communication link 40. The arrangement includes six digital sending stations $10_1$ through $10_6$ respectively connected by six AND logic gates $30_1$ through $30_6$ to a like plurality of linear sequential encoders $20_1$ through $20_6$. A first synchronizing source 39 is included in the FIG. 1 arrangement to coincidentally enable each of the AND gates $30_1$ through $30_6$ at regularly recurring information sampling intervals each comprising six time slots.

Each linear sequential encoder $20_k$ is adapted to respond to a binary "1" voltage signal supplied thereto by the corresponding AND gate $30_k$ by supplying a unique, characteristic 6-bit serial binary word $v_k$ to an associated input terminal included on a modulo 2 adder gate 35. Modulo 2 gates are well known in the art, and perform Exclusive OR logic in respectively generating a "1" or "0" binary output signal responsive to an odd or even number of received binary "1" input signals. The six 6-bit binary words $v_k$ may advantageously comprise any consistent set of linearly independent 6-tuples none of which is a cyclic permutation of any other. In the particular illustrative transmission system depicted in FIG. 1, $$\begin{array}{l} v_1=1\,1\,1\,0\,1\,0 \\ v_2=0\,1\,0\,1\,0\,1 \\ v_3=1\,1\,0\,0\,0\,1 \\ v_4=0\,1\,1\,0\,1\,0 \\ v_5=1\,0\,1\,1\,0\,1 \\ \text{and} \\ v_6=1\,1\,1\,0\,0\,1 \end{array} \qquad (1)$$

It is noted that selected 6-tuple digital words, including both the $v_k$ given above and also other, later, defined words, are alternately referred to as column matrices. In each case, the elements of the matrix array identically correspond to the digits of the associated binary word.

The linear sequential encoder $20_1$ is shown in detail in FIG. 1 and comprises a series connection of a plurality of delaying elements 21 through 25 and a plurality of OR logic gates 26 through 28, with the output of the AND gate $30_1$ being connected to the delaying element 21 and to an input of each of the OR gates 26 through 28. The time delay generated by each of the delaying elements 21 through 25, as well as that produced by other such elements illustrated in FIG. 1, corresponds to the duration of one time slot.

As mentioned hereinabove, the encoder $20_1$ is adapted to respond to a binary "1" voltage pulse supplied by the gate $30_1$ for generating the binary word 111010, where the digits included therein are generated in time from right to left. Accordingly, the four binary "1" digits included in the word $v_1$ are respectively supplied by the gate $30_1$ and the OR gates 26 through 28 to the input terminals of the delaying elements 21, 22, 23 and 25, while no energization, corresponding to a binary "0," is impressed on the input of the delaying gate 24. The right-most "0" in the word $v_1$ is immediately detected at the modulo 2 gate 35, since no binary "1" voltage pulse is directly supplied thereto by the AND gate $30_1$, or by any of the OR gates 26 through 28. The digits 1, 1, 1, 1, 0 and 1 then sequentially traverse through the delaying elements 21 through 25, and are serially supplied to the gate 35 by the final delaying element 25 in the aforementioned right to left order. To further facilitate the understanding of the operation of the linear sequential encoders 20, the encoder $20_5$, which generates the characteristic word 101101 is depicted in detail in FIG. 1.

For purposes of fabricating the hereinafter described decoding structure, it is necessary to define a matrix [P] whose columns comprise the ordered words $v_k$. That is, $$[P]=\begin{bmatrix} 1&0&1&0&1&1 \\ 1&1&1&1&0&1 \\ 1&0&0&1&1&1 \\ 0&1&0&0&1&0 \\ 1&0&0&1&0&0 \\ 0&1&1&0&1&1 \end{bmatrix} \qquad (2)$$

where the first through sixth columns of the matrix [P] respectively comprise $v_1$ through $v_6$. Since the vectors $[v_k]$ are linearly independent, i.e., not derivable one from the other by an additive arithmetic operation, the matrix [P] is nonsingular and has an inverse $[P]^{-1}$ where, $$[P]^{-1}=\begin{bmatrix} 1&1&0&1&1&0 \\ 0&1&0&1&1&1 \\ 0&1&1&1&0&0 \\ 1&1&0&1&0&0 \\ 0&1&0&0&1&1 \\ 0&1&1&0&0&1 \end{bmatrix} \qquad (3)$$

Equation 3 may be verified by inverting the matrix [P] by any of the plurality of well-known techniques therefor, employing modulo 2 addition for all summations. As discussed hereinafter, the rows of the matrix $[P]^{-1}$ define the circuit interconnections for six decoders $60_1$ through $60_6$ which extract the input intelligence from the digital signals multiplex on the link 40.

The modulo 2 adder gate 35 has an output thereon connected to the input end 41 of the common communication link 40. The link 40 further includes an output end 42 connected to a series-to-parallel digital converter comprising six series-connected delaying elements 50 through 55. The output terminal of each of the delaying elements 50 through 55 is multipled with a synchronizing signal supplied by a synchronizing source 36 as enabling input signals to a corresponding one of a plurality of AND logic gates 90 through 95. The gates 50 through 55 are adapted to register at the output terminals thereon the six sequentially-transmitted digital bits which are impressed on the link 40 every information sampling cycle.

A plurality of linear sequential decoders $60_1$ through $60_6$ are included in the FIG. 1 arrangement to respectively connect the gating elements 90 through 95, and thereby also the delaying elements 50 through 55, to an associated plurality of digital receiving stations $70_1$ through $70_6$. It is noted that the sending stations $10_1$ through $10_6$ are illustrated in the FIG. 1 embodiment as communicating with the receiving stations $70_1$ through $70_6$, respectively.

Each decoder 60 comprises a modulo 2 adder 65 having a plurality of input terminals thereon selectively connected to the gates 90 through 95 in accordance with the corresponding row of the matrix $[P]^{-1}$. More specifically, as indicated in Table I infra, the modulo 2 gates $65_1$ through $65_6$ are connected to the gates 90 through 95 when binary "1's" appear in the corresponding row and column of the matrix $[P]^{-1}$, and not connected when "0's" thereappear. This set of circuit interconnections is listed in Table I infra, wherein a binary "1" or "0" entry respectively indicates a connection or no connection between a modulo 2 gate 65 and the corresponding AND gate.

TABLE I

| Modulo 2 Gates | AND Gates | | | | | |
|---|---|---|---|---|---|---|
| | 90 | 91 | 92 | 93 | 94 | 95 |
| $65_1$ | 1 | 1 | 0 | 1 | 1 | 0 |
| $65_2$ | 0 | 1 | 0 | 1 | 1 | 1 |
| $65_3$ | 0 | 1 | 1 | 1 | 0 | 0 |
| $65_4$ | 1 | 1 | 0 | 1 | 0 | 0 |
| $65_5$ | 0 | 1 | 0 | 0 | 1 | 1 |
| $65_6$ | 0 | 1 | 1 | 0 | 0 | 1 |

To keep FIG. 1 from becoming unduly complex, only the connections for the gates $65_1$ and $65_5$ are shown in detail.

Note that the digital array included in Table I identically corresponds to the matrix array $[P]^{-1}$ given by Equation 3. As described hereinafter, the $k$th decoder $60_k$ advantageously performs the vector matrix multiplication $$[P_k]^{-1}\sum_k [v_k]$$

where $[P_k]^{-1}$ represents the $k$th row of the matrix $[P]^{-1}$, and the latter term is the sum of the selectivity generated characteristic words $v_k$ added by the gate 35 and supplied to the channel 40.

With the above organization in mind, a typical sequence of circuit operation for the FIG. 1 time division digital transmission arrangement will now be described. Assume now that the sending stations $10_1$ and $10_2$ are transmitting binary "1" information digits to the receiving stations $70_1$ and $70_2$, while the remaining stations $10_3$ through $10_6$ are sending binary "0's" to the associated receiving stations $70_3$ through $70_6$.

When the source 39 sends the next recurring word synchronizing pulse to the AND gates $30_1$ through $30_6$, the binary "1" voltage pulses supplied by the stations $10_1$ and $10_2$ are passed to the encoders $20_1$ and $20_2$, while "0" signals are detected by the encoders $20_3$ through $20_6$. Responsive to this set of energizing pulses supplied by the gates $30_1$ through $30_6$, the encoders $20_3$ through $20_6$ are inactive and do not generate the words $v_3$ through $v_6$ associated therewith. However, the encoders $20_1$ and $20_2$ are enabled and these circuit combinations transmit the characteristic words $v_1$ and $v_2$, viz., 111010 and 010101 to the adder 35, with the right-hand digits being generated first. The modulo 2 adder 35 performs Exclusive OR logic on a digit-by-digit basis upon the received digital words $v_1$ and $v_2$, and impresses the composite digital word $w$ on the link 40, where, $$w=\sum_{k=1}^{2} v_k = 111010+010101=101111 \qquad (4)$$

It is noted that the summation in Equation 4, as well as all of the additions encompassed within the scope of the present invention are performed on a modulo 2 basis.

Examing the above encoding process in generalized terms, let the unencoded information signals generated by the $k$th station $10_k$ be given by a vector $[s_k]$, where $[s_k]$ is a column matrix with the information "1" or "0" bit ($\alpha_k$) in the $k$th row, and "0's" elsewhere. Also, for purposes of definition, let a column vector $[m]$ represent the composite message sent by the six sending stations $10_1$ through $10_6$, such that, $$[m]=\sum_{k=1}^{6}[s_k]=\begin{bmatrix}\alpha_1\\ \alpha_2\\ \alpha_3\\ \alpha_4\\ \alpha_5\\ \alpha_6\end{bmatrix} \qquad (5)$$

Since the $k$th column of $[P]$ is $v_k$, when $\alpha_k$ is a "1" it is observed that, $$[P][s_k]=[v_k] \qquad (6)$$

Also, the 6-bit multiplexed word $w$ on the link 40, when written in matrix notation, is given by, $$[w]=\sum_{k}[v_k] \qquad (7)$$

where the indefinite summation runs over all the $v_k$ which are selectively generated by the encoders $20_1$ through $20_6$. Employing the relationships set forth in Equations 5 and 6 in Equation 7, note that, $$[w]=\sum_{k}[v_k]=[P]\sum_{k=1}^{6}[s_k]=[P][m] \qquad (8)$$

For the particular message assumed above, viz., $$[m]=\begin{bmatrix}1\\1\\0\\0\\0\\0\end{bmatrix} \qquad (9)$$

it may readily be seen that the operation indicated in Equation 8, i.e., $$[w]=[P][m]=\begin{bmatrix}1&0&1&0&1&1\\1&1&1&1&0&1\\1&0&0&1&1&1\\0&1&0&0&1&0\\1&0&0&1&0&0\\0&1&1&0&1&1\end{bmatrix}\begin{bmatrix}1\\1\\0\\0\\0\\0\end{bmatrix}=\begin{bmatrix}1\\0\\1\\1\\1\\1\end{bmatrix} \qquad (10)$$

yields a result in accord with that derived above in Equation 4, from purely circuit considerations, for the digital word impressed on the link 40.

The transmitted binary word 101111 on the link 40 is sequentially translated down the delaying chain comprising the delaying elements 50 through 55, such that the digits 1, 0, 1, 1, 1 and 1 respectively reside at the output terminals of the gates 50 through 55 after the six delaying intervals which comprise one information bit transmission cycle. After the time corresponding to six time slots has elapsed, the synchronizing sources 36 and 39, in combination with a synchronizing lead 37, are each adapted to generate a pulse indicative of a new transmission cycle. The pulse supplied by the source 39 initiates a new information sampling cycle in the manner described above, while the energization generated by the source 36 is functionally adapted to enable the AND gates 90 through 95, thereby passing the information present at the output terminals of the delaying elements 50 through 55 through the AND gates 90 through 95 for decoding purposes.

In overall conceptual terms, the six decoding elements $60_1$ through $60_6$, which are constructed according to the matrix $[P]^{-1}$ in the above-described manner, perform the matrix operation, $$[P]^{-1}\sum_{k}[v_k]=[P]^{-1}[w] \qquad (11)$$

Employing the matrix relationships expressed in Equations 5 and 8, it follows that, $$[P]^{-1}[w]=[P]^{-1}\cdot[P]\sum_{k=1}^{6}[s_k]=\sum_{k=1}^{6}[s_k]=[m]=\begin{bmatrix}\alpha_1\\ \alpha_2\\ \alpha_3\\ \alpha_4\\ \alpha_5\\ \alpha_6\end{bmatrix} \qquad (12)$$

Thus, the decoders 60 are operative to extract the original message $[m]$, and thereby also the original information bits of $\alpha_k$ from the composite word on the line.

Each decoder 60 is adapted to represent only a single, corresponding row of the matrix $[P]^{-1}$. Considering $[P_k]^{-1}$ as the $k$th row of $[P]^{-1}$, the decoder $60_k$ performs the matrix multiplication $[P_k]^{-1}[w]$. However, referring to Equation 12, it is noted that, $$[P_k]^{-1}[w]=\alpha_k \qquad (13)$$

and thus the decoder $60_k$ functions to supply the input information digit $\alpha_k$ to the corresponding receiving station $70_k$. Applying Equation 13 to the specific digital information pattern chosen for illustration, and examining the operation of the decording gate $65_1$, note that this gate performs the matrix multiplication, $$[P_1]^{-1}[w]=[110110]\begin{bmatrix}1\\0\\1\\1\\1\\1\end{bmatrix}=1+0+0+1+1+0=\alpha_1=1 \qquad (14)$$

thereby supplying the input digital "1" signal, generated by the sending station $10_1$, to the receiving station $70_1$.

With reference to the particular structure of the decoder $60_1$, note that the three binary "1" digits appearing in the sum indicated in Equation 14 are supplied to the adder $65_1$ via three energized decoding input leads 62, 63 and 64 illustrated in FIG. 1. The gate $65_1$ performs a modulo 2 sum over the three binary "1" input digits, and supplies the correct $\alpha_1$ information digit (a binary "1") to the receiving station $70_1$.

In a similar manner, the remaining decoding gates $65_2$ through $65_6$ respectively perform the matrix operations, $$[P_2]^{-1}[w]=[010111]\begin{bmatrix}1\\0\\1\\1\\1\\1\end{bmatrix}=0+0+0+1+1+1=\alpha_2=1 \qquad (15)$$

$$[P_3]^{-1}[w]=[011100]\begin{bmatrix}1\\0\\1\\1\\1\\1\end{bmatrix}=0+0+1+1+0+0=\alpha_3=0 \qquad (16)$$

$$[P_4]^{-1}[w]=[110100]\begin{bmatrix}1\\0\\1\\1\\1\\1\end{bmatrix}=1+0+0+1+0+0=\alpha_4=0 \qquad (17)$$

$$[P_5]^{-1}[w]=[010011]\begin{bmatrix}1\\0\\1\\1\\1\\1\end{bmatrix}=0+0+0+0+1+1=\alpha_5=0 \qquad (18)$$

and $$[P_6]^{-1}[w]=[011001]\begin{bmatrix}1\\0\\1\\1\\1\\1\end{bmatrix}=0+0+1+0+0+1=\alpha_6=0 \qquad (19)$$

thereby respectively supplying the proper information bits to the receiving stations $70_2$ through $70_6$.

Regarding the binary sum associated with the decoder $60_5$ given in Equation 18, note that the two binary "1's" included therein are supplied to the gate $65_5$ by two leads 65 and 66 shown in FIG. 1. The gate $65_5$ operates on the two binary "1's" by supplying the requisite binary 0 bit to the receiving station $70_5$.

The FIG. 1 arrangement continuously responds to successive pulses supplied by the synchronizing sources 36 and 39 by iteratively operating in the above-described mode to transmit new sets of information digits from the sending stations $10_1$ through $10_6$ to the corresponding receiving stations $70_1$ through $70_6$.

In the above discussion, the FIG. 1 arrangement was shown to transmit digital information between corresponding sending and receiving stations $10_k$ and $70_k$ when the sources 36 and 39 were functioning in time synchronization. Should the source 36 not be in time phase with the source 39, the six binary bits appearing at the outputs of the delaying gates 50 through 55 would comprise an arbitrary grouping of binary digits generated in two consecutive information sampling cycles. Under this set of circuit conditions, the transmission properties described above for the FIG. 1 arrangement do not obtain, and unintelligible, garbled messages are transmitted to the receiving stations $70_1$ through $70_6$. Thus, privacy is preserved when synchronization is lost, and legible messages are not sent to incorrect addresses.

Moreover, redundant parity checking bits may advantageously be included in the characteristic encoder-generated words $v_k$ to provide a transmission error detecting and connecting capability in accordance with any of the coding processes well known in the art. Such a feature is not available in prior art digital multiplexing embodiments.

Summarizing the basic concepts of an illustrative embodiment of the present invention, a time division digital transmission arrangement advantageously includes $n$ digital sending stations each connected via an associated linear sequential encoder and a common modulo 2 adder to the input end of a transmission channel. Similarly, $n$ receiving stations, each communicating with a corresponding sending station, are joined by linear sequential decoders to the output end of the common channel.

Responsive to a binary "1" information signal supplied thereto by the associated sending station, each encoder generates a unique, characteristic $n$-bit binary word. The signals so generated are processed by the adder and sequentially impressed on the common link.

At the output end of the transmission channel, each decoder detects the relative presence or absence of an associated encoded word in the composite signal on the link. The decoded input intelligence is then supplied to the corresponding receiving station.

It is to be understood that the above-described arrangement is only illustrative of the application of the principles of the present invention. Numerous other arrangements may be devised by those skilled in the art without departing from the spirit and scope of the present invention. For example, while six sending and receiving stations are included in the FIG. 1 arrangement for purposes of illustration, any number $n$ of such stations, along with $n$ encoders 20 and $n$ decoders 60 might well have been employed. Also, other series-to-parallel digital converters may be employed in place of the delaying gates 50 through 55.

What is claimed is:

1. In combination, a plurality of digital sending stations and a like plurality of receiving stations respectively communicating therewith, a common transmission channel, a first modulo 2 adder connected to one end of said channel, a plurality of linear sequential encoders respectively connecting each of said sending stations to said adder, said encoders being responsive to binary "1" signals supplied thereto from the associated sending stations for generating unique characteristic digital words, each of said words comprising the same number of digit positions, and a plurality of linear sequential decoders each connecting the other end of said transmission channel with a different one of said receiving stations.

2. A combination as in claim 1, wherein said encoders comprise a selective series connection of a plurality of delaying elements and a plurality of gating means for selectively supplying initial binary "1" signals to said delaying elements.

3. A combination as in claim 2, further comprising a multistage series-to-parallel converter interposed between said transmission channel and said decoders, and wherein each of said decorders comprises a modulo 2 adder gate having a plurality of input terminals thereon connected to selected ones of said converter stages.

4. A combination as in claim 3, wherein said series-to-parallel digital converter comprises a plurality of series-connected delaying elements.

5. A combination as in claim 4, further comprising a first plurality of AND logic gates respectively interposed between said sending stations and said encoders, a second plurality of AND logic gates respectively interposed between said series-to-parallel converter stages and said associated decoding modulo 2 gate input terminals, first and second synchronizing sources for respectively enabling said first and second plurality of AND logic gates, and means for synchronizing said synchronizing sources.

6. In combination, $n$ linear sequential encoders for selectively generating $n$ unique, characteristic linearly independent $n$-bit digital words $v_k$, where $n$ is any positive integer greater than one and $k$ runs from zero to $n$, a communication link, and a modulo 2 logic gate connected to said encoders for multiplexing said $n$-bit digital words generated by said encoders onto said communication link.

7. A combination as in claim 6, further comprising $n$ linear sequential decoders connected to said communication channel for generating binary signals given by $[P]^{-1}[w]$, where $[w]$ comprises said multiplexed digital signals appearing on said link, and $[P]^{-1}$ is the inverse of a matrix $[P]$ which comprises ordered columns of said digital words $v_k$, such that the product $[P][P]^{-1}$ yields an identity matrix.

8. A combination as in claim 7, wherein said $n$ encoders comprise the selective series connection of up to $n$ delaying elements and a plurality of gating means for selectively supplying initial binary "1" signals to said delaying elements.

9. A combination as in claim 8, further comprising an $n$-stage series-to-parallel digital converter interposed between said transmission channel and said $n$ decoders, each of said decoders comprising a modulo 2 adder gate having a plurality of input terminals thereon selectively connected to said $n$ converter stages in accordance with corresponding rows of said $[P]^{-1}$ matrix.

10. In combination, a plurality of linear sequential encoders each comprising the selective series connection of a plurality of delaying elements and a plurality of logic gates for applying signals directly to selected ones of said delaying elements, and a first modulo 2 adding gate having a plurality of input terminals thereon each connected to a different one of said encoders.

11. A combination as in claim 10, further comprising a multistage series-to-parallel converter connected to said first modulo 2 adding gate, and a plurality of linear sequential decoders each comprising a modulo 2 adding gate having a plurality of input terminals thereon selectively connected to said converter stages.

12. A combination as in claim 11, wherein said encoders comprise means for generating characteristic digital words in accordance with corresponding columns of a nonsingular matrix $[P]$, and said decoding modulo 2 adding gates are respectively connected to said converter stages in accordance with corresponding rows of the matrix $[P]^{-1}$.

13. In combination, a plurality of encoding means for selectively generating digital words in accordance with corresponding columns of a matrix [P], a modulo 2 adder gate connected to each of said encoding means for transmitting output digital signals corresponding to a modulo 2 sum of the input characteristic binary signals supplied thereto, and a plurality of decoding means connected to said adder for respectively matrix multiplying said modulo 2 adder output signals by corresponding rows of a matrix $[P]^{-1}$, where $[P][P]^{-1}=[I]$, with [I] being the identity matrix.

References Cited

UNITED STATES PATENTS

| | | | |
|---|---|---|---|
| 3,069,657 | 12/1962 | Green et al. | 340—146.1 |
| 3,141,928 | 7/1964 | Davey et al. | 178—58 |

ROBERT L. GRIFFIN, *Acting Primary Examiner.*

JOHN W. CALDWELL, *Examiner.*

J. T. STRATMAN, *Assistant Examiner.*